United States Patent
Liu et al.

(10) Patent No.: US 7,557,880 B2
(45) Date of Patent: Jul. 7, 2009

(54) TRANSFLECTIVE LCD HAVING A DUAL COMMON-ELECTRODE STRUCTURE

(75) Inventors: Chin-Chang Liu, Fongyuan (TW); Yi-Chun Wu, Hualien (TW); Chun-Chi Chi, Taichung Hsien (TW)

(73) Assignee: Wintek Corporation, Tanzih Hsiang, Taichung Hsien (TW)

( * ) Notice: Subject to any disclaimer, the term of this patent is extended or adjusted under 35 U.S.C. 154(b) by 258 days.

(21) Appl. No.: 11/599,282

(22) Filed: Nov. 15, 2006

(65) Prior Publication Data
US 2007/0177078 A1   Aug. 2, 2007

(30) Foreign Application Priority Data
Jan. 27, 2006   (TW) ............................... 95103251 A

(51) Int. Cl.
*G02F 1/1335* (2006.01)
(52) U.S. Cl. ..................................................... 349/114
(58) Field of Classification Search ............ 349/114
See application file for complete search history.

(56) References Cited

U.S. PATENT DOCUMENTS 6,806,929 B2   10/2004   Chen et al.

2006/0215086 A1 *   9/2006   Kurasawa .................... 349/114

OTHER PUBLICATIONS

Gazette Publication of TW 502237 patent.

* cited by examiner

*Primary Examiner*—Sarah Song
(74) *Attorney, Agent, or Firm*—patenttm.us

(57) ABSTRACT

A transflective LCD having a dual common-electrode structure has a front substrate, a liquid crystal layer and a rear substrate. The front substrate has multiple first and second common electrodes respectively connected to a first and a second contact pads. The first and second contact pads are respectively connected to two voltage sources to obtain different voltage. The rear substrate has multiple pixels, each has a reflective region and a transmission region. The reflective region is aligned to the first common electrode and the transmission region is aligned to the second common electrode. Since the voltages to the first and second common electrodes are different, the voltages of two liquid crystal capacitors corresponding to the reflective and transmission regions are also different. Therefore, the V-T curves of one pixel are adjustable to be close to each other by supplying different voltages to the first and second common electrodes.

4 Claims, 7 Drawing Sheets

US 7,557,880 B2

TRANSFLECTIVE LCD HAVING A DUAL COMMON-ELECTRODE STRUCTURE

BACKGROUND OF THE INVENTION

1. Field of the Invention

The present invention relates to a transflective LCD, and more particularly to a transflective LCD having a dual common-electrode structure.

2. Description of Related Art

Please refer to FIG. 4, a cross sectional view of one pixel in one conventional transflective LCD has a front substrate (60), a liquid crystal layer (70) and a rear substrate (80). The front substrate (60) has a flat transparent conductive film used as a common electrode (61). The rear substrate (80) has a thin film transistor (TFT) (81), a storage capacitor (82) and a reflective layer (83) that is above the TFT (81) and the storage capacitor (82). Since the pixel is in the transflective type LCD, each pixel has a reflective region (R) corresponding to the reflective layer (83) and a transmission region (T). The reflective region (R) reflects the ambient light (L1) and the transmission region (T) allows the back light (L2) to pass through the rear and front substrates (80, 60). With reference to FIG. 5, since each pixel is driven only by a driving voltage but has the reflective and transmission regions (R, T), each pixel accordingly has two different separate V-T curves ($R_{V-T}$, $T_{V-T}$).

As disclosed the U.S. Pat. No. 6,806,929 entitled "Transflective LCD driven by bi-gamma curve" issued to Chen et al. ('929 hereinafter), with reference to FIG. 8, since the cell gap (d1) of the reflective region differs from the cell gap (d2) of the transmission region, the transmission region has a phase difference nearly double that of the reflective region. Reduction in cell gap of the reflective region has been adopted in the prior art to minimize the phase difference. However, it is difficult to adjust the cell gaps (d1, d2) of the reflective and transmission regions to fit the LCD's operation mode. Therefore, the '929 patent provides two separate TFT driving circuits in each pixel and uses two gamma curves from a data driving unit to fit two V-T curves. Each TFT driving circuit has a thin film transistor, a storage capacitor and a liquid crystal capacitor. The two TFT driving circuits respectively correspond to the reflective and transmission regions to supply two suitable driving voltages to the reflective and transmission regions. The fabricating cost of the LCD provided by the '929 patent reasonably increases and the effective area of each pixel is reduced.

In a Taiwan patent (TW502237) a method of adjusting the V-T curve of the LCD is disclosed. According to the method, the V-T curve is changed by adjusting the voltage supplied to the common electrode. With reference to FIG. 6, a voltage waveform diagram shows a voltage waveform of the data line (Vd), a voltage waveform of the common electrode (VCOM) and a voltage waveform of a liquid crystal capacitor ($V_{LC}$). In general, the voltage of the common electrode should be kept in a constant level. However, the '237 patent adjusts the voltage level of the common electrode to change the voltage of the liquid crystal capacitor.

With further reference to FIG. 7, multiple V-T curves (A, B, C, D, O) can be produced based on different voltages supplied to the common electrode. Therefore, the V-T curve can be changed by supplying different voltage to the common electrode.

Therefore, the present invention provides a transflective LCD having a dual common-electrode structure and uses adjustable voltages supplied to common electrodes to produce two V-T curves similar to each other.

SUMMARY OF THE INVENTION

The main objective of the present invention is to provide a transflective LCD that has a dual common-electrode structure.

A transflective LCD having a dual-common electrode structure has a front substrate, a liquid crystal layer and a rear substrate. The front substrate has multiple first and second common electrodes and a first and second contact pads respectively connected to the first and second common electrodes. The first and second contact pads are respectively different voltage. The rear substrate has multiple pixels, the pixel has a reflective region and a transmission region. The reflective region is corresponding to the first common electrode and the transmission region is corresponding to the second common electrode. Since the voltages of first and second common electrodes are different, the voltages of two regions of the liquid crystal layer corresponding to the reflective and transmission regions are different. Therefore, the V-T curves of the reflective and transmission regions in the pixel are adjusted to be similar.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
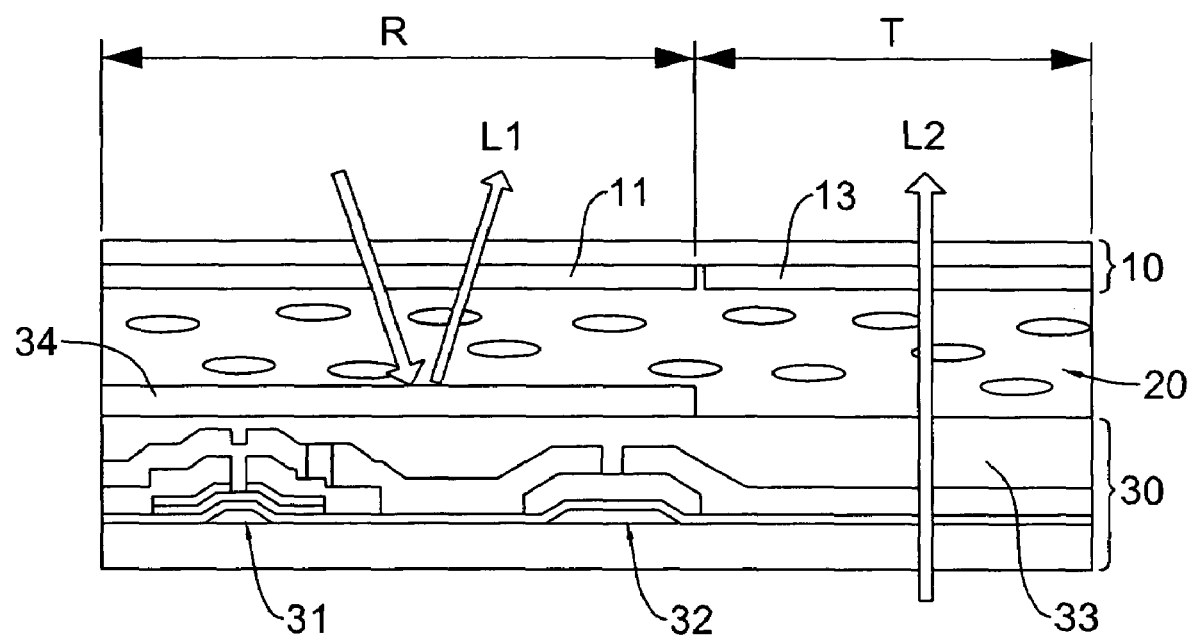
FIG. 1 is a cross sectional view of one pixel of a transflective LCD in accordance with the present invention.

With reference to FIG. 1, one pixel of a transflective LCD in accordance with the present invention has a front substrate (10), a liquid crystal layer (20) and a rear substrate (30). The liquid crystal layer (20) is sealed between the front and rear substrates (10, 20).

Figure 2:
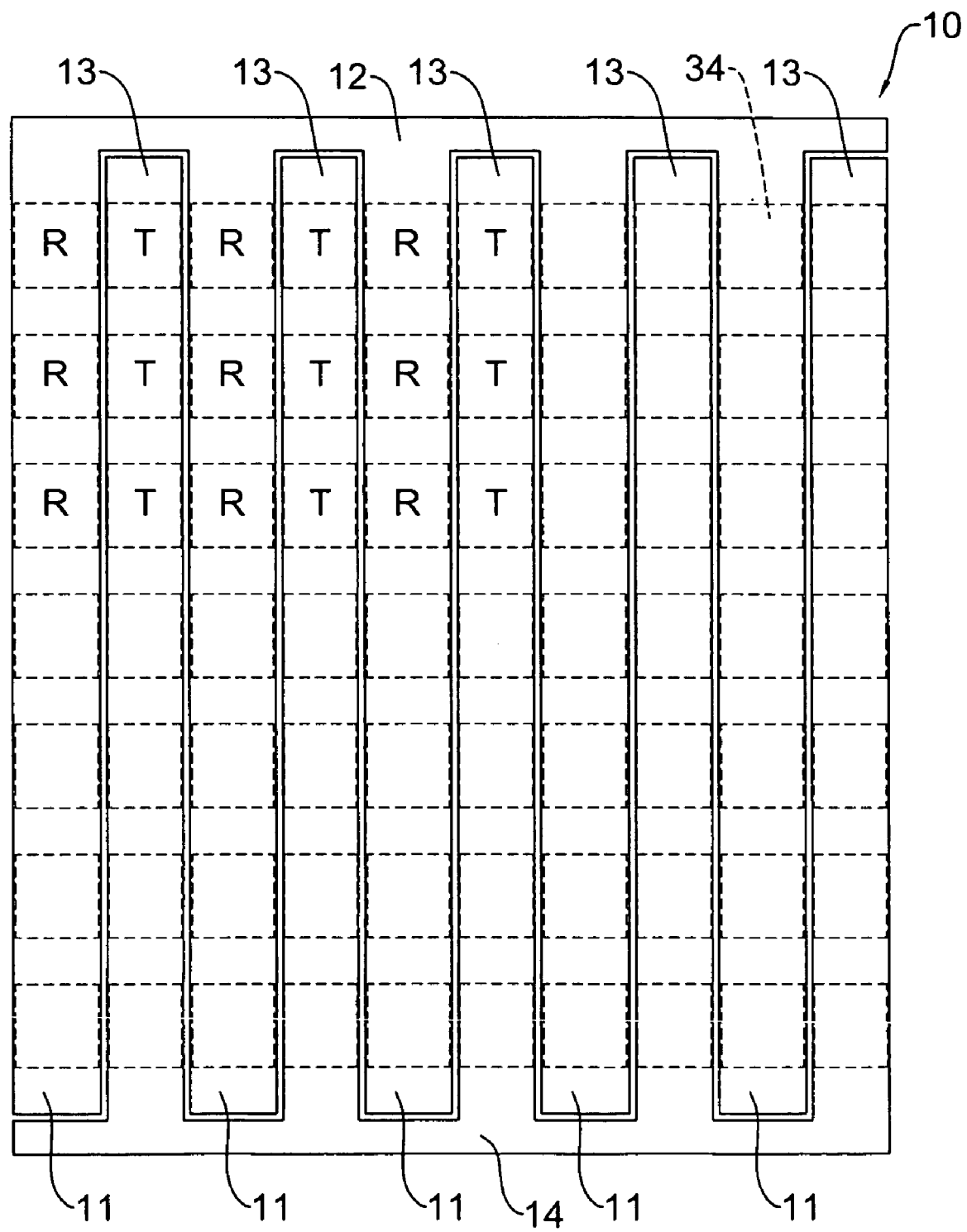
FIG. 2 is a top plan view of the transflective LCD in accordance with the present invention, wherein a front substrate is omitted from the drawing.

With further reference to FIG. 2, a dual common-electrode structure is formed on the front substrate and comprises multiple first common electrodes (11), a first contact pad (12), multiple second common electrodes (13) separated from the multiple first common electrodes (11) and a second contact pad (14). The first common electrodes (11) are connected to the first contact pad (12). The second common electrodes (13) are connected to the second contact pad (14).

With reference to FIG. 1, one pixel of the rear substrate (30) is depicted as an example and has a thin film transistor (TFT) (31), a storage capacitor (32), a display electrode (33) and a reflective film (34) above the TFT (31) and the storage capacitor (32). The pixel has a reflective region (R) and a transmission region (T), as shown in FIG. 2. The reflective region (R) is corresponding to the reflective film (34) since the reflective film (34) reflects the ambient lights (L1) toward the front substrate (10). The transmission region (T) is not covered by the reflective film (34) to allow the back lights (L2) to pass through the rear substrate (30) to the front substrate (10).

The boundaries of the reflective region (R) and the transmission region (T) are respectively aligned to corresponding boundaries of the first common electrodes (11) and the second common electrodes (13) when the front substrate (10) is assembled to the rear substrate (30). In general, the area ratio of a reflective region (R) to a transmission region (T) can be 1:1, 4:6 or 6:4. Accordingly, the area ratio of the first common electrode (11) to the second common electrode (13) approximates to 1:1, 4:6 or 6:4.

Figure 3:
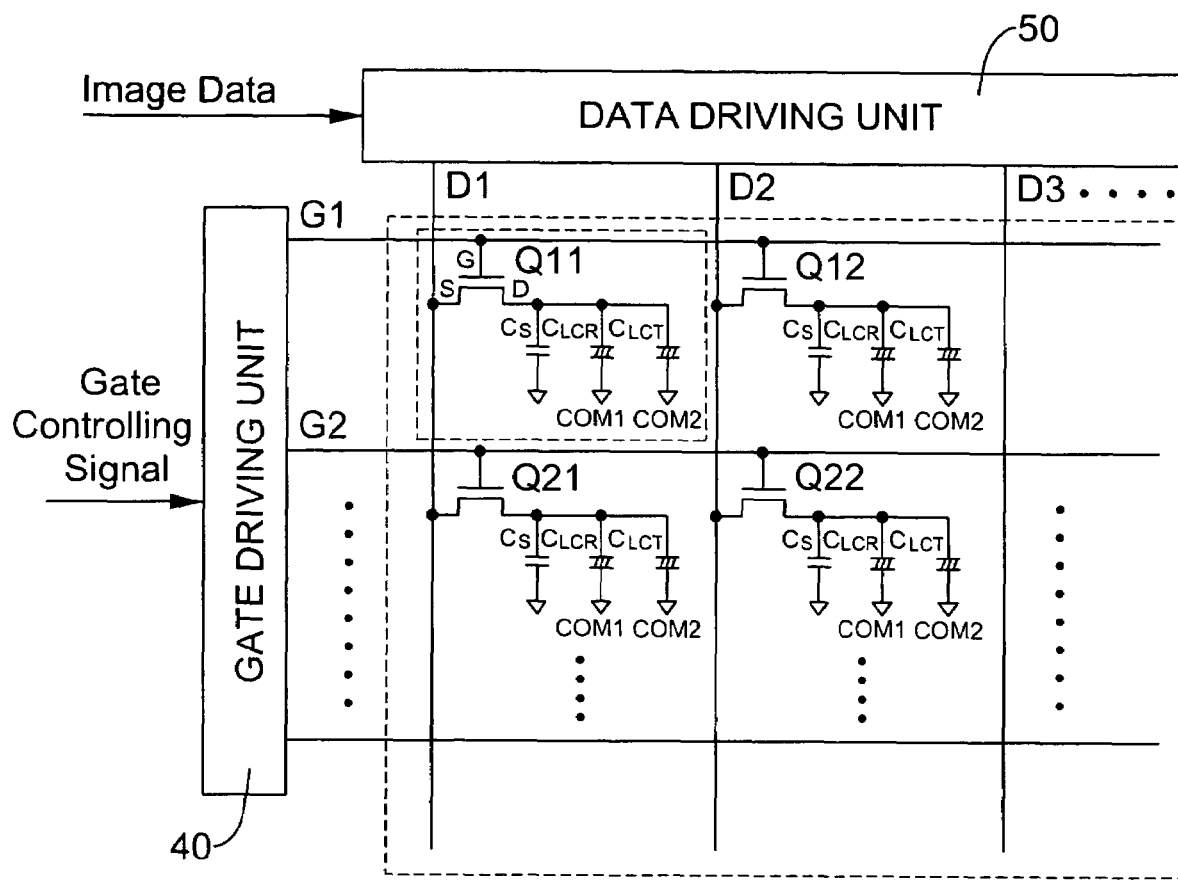
FIG. 3 is an equivalent circuit diagram of the transflective LCD in accordance with the present invention.
Figure 4:
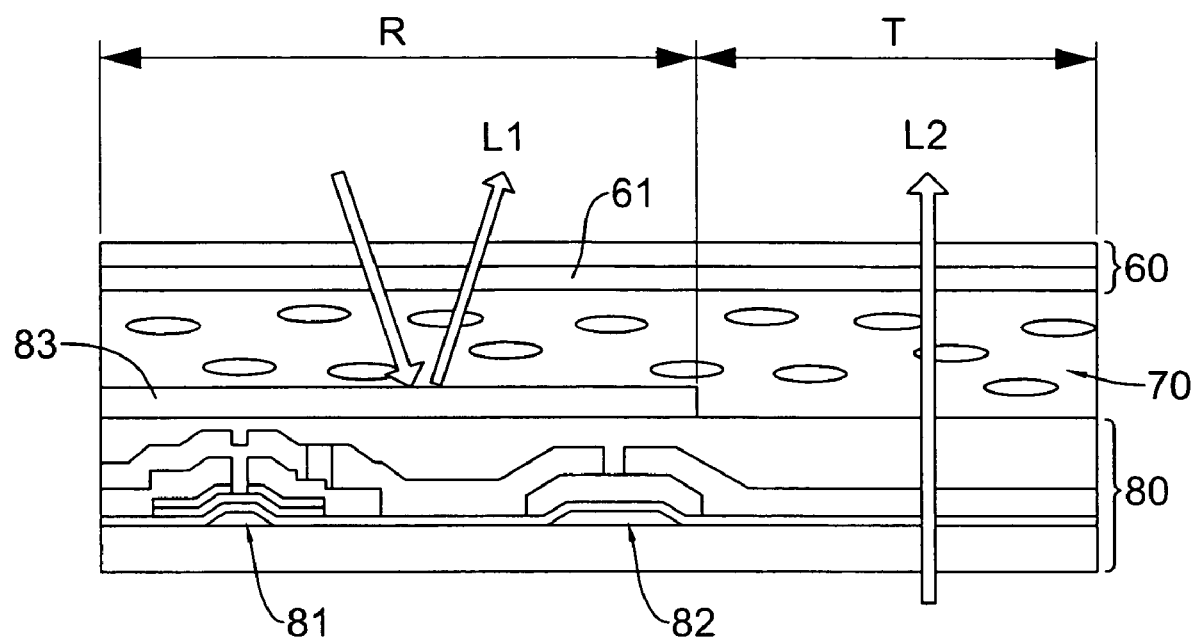
FIG. 4 is a cross sectional view of one pixel of a conventional transflective LCD in accordance with the prior art.
Figure 5:
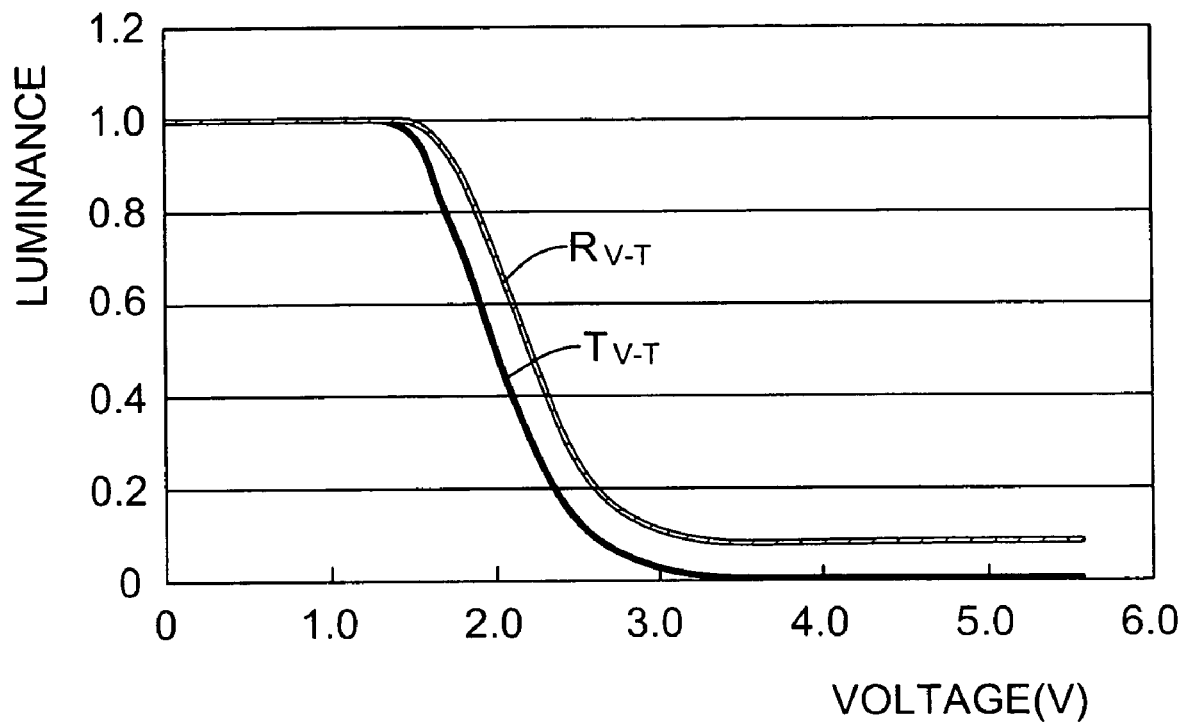
FIG. 5 is a diagram showing two V-T curves of one pixel of the transflective LCD in accordance with the prior art.
Figure 6:
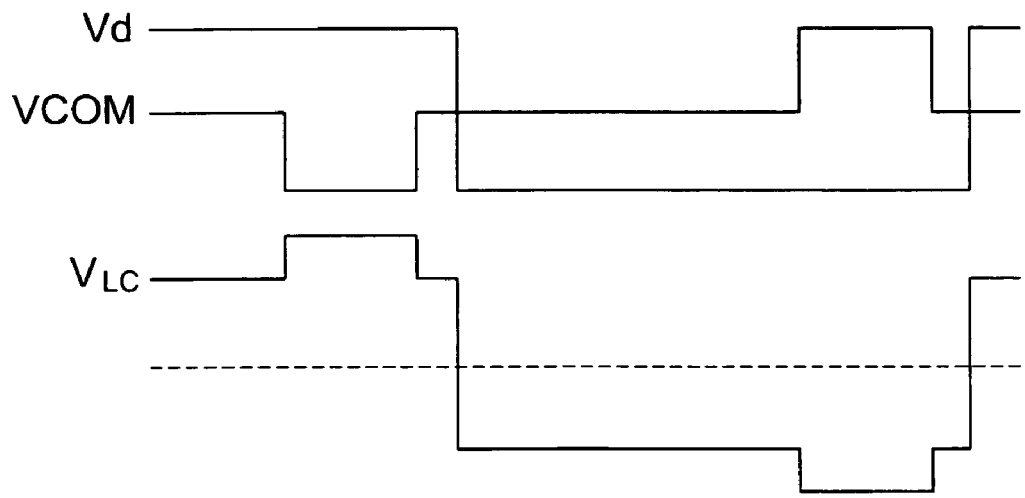
FIG. 6 is a voltage waveform diagram showing a driving voltage of the data line (Vd), a voltage of a common electrode (VCOM) and a voltage of a liquid crystal capacitor ($V_{LC}$) of a conventional LCD in accordance with the prior art.
Figure 7:
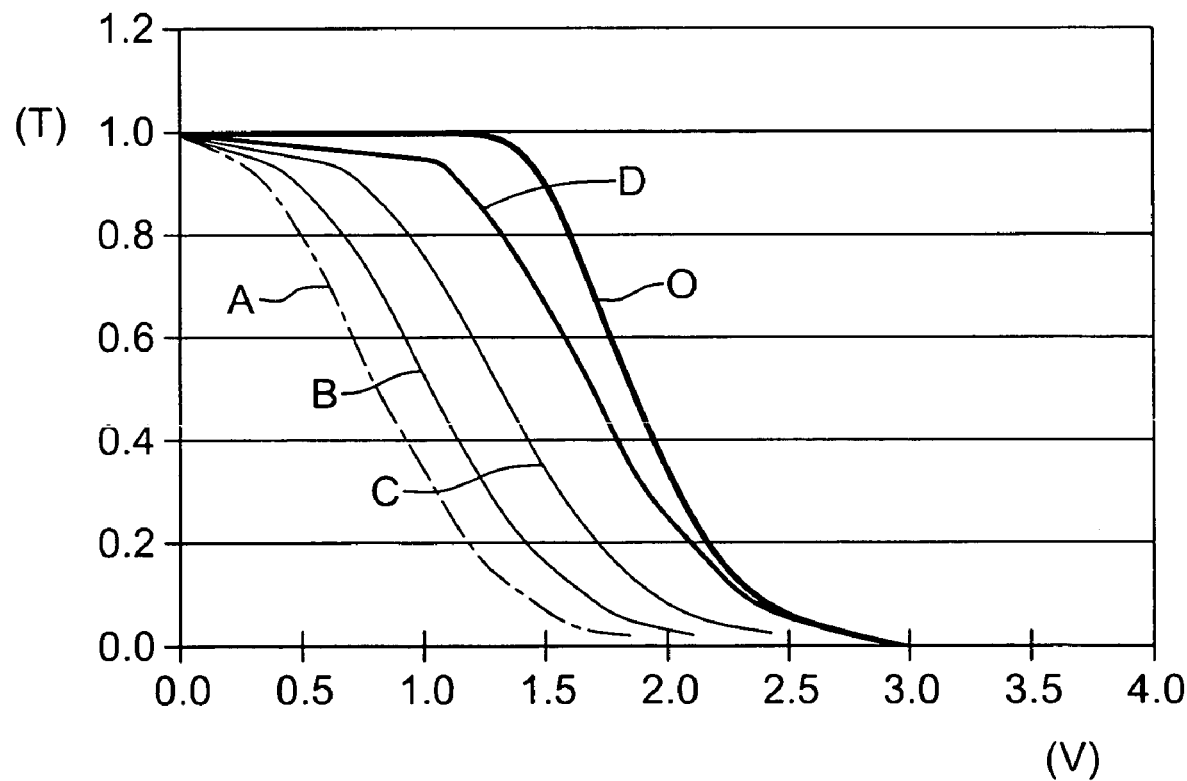
FIG. 7 is a diagram showing different V-T curves produced based on different driven voltage waveforms of the conventional LCD of FIG. 6.
Figure 8:
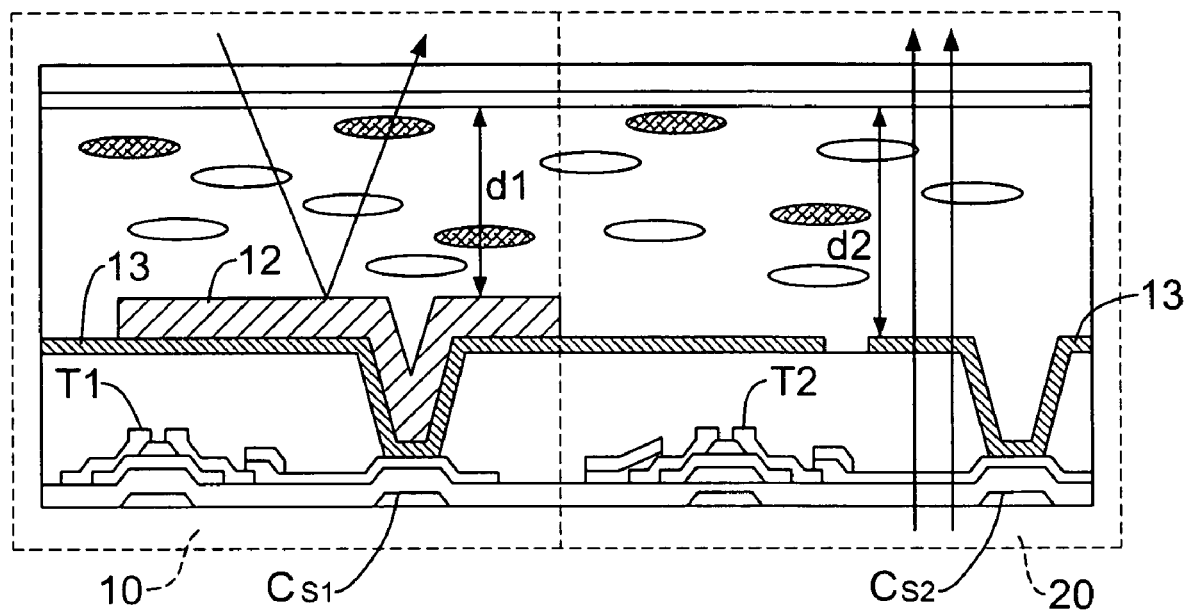
FIG. 8 is a FIG. 7A of U.S. Pat. No. 6,806,929.

With further reference to FIG. 3, since the front substrate (10) includes the first and second common electrodes (11, 13), an equivalent driving circuit for a pixel of the transflective LCD in accordance with the present invention includes the transistor (Q11), the storage capacitor ($C_S$), a first liquid crystal capacitor ($C_{LCR}$) and a second liquid crystal capacitor ($C_{LCT}$).

The transistor (Q11) has a gate terminal (G), source terminal (S) and drain terminal (D). The gate terminal (G) is connected to a scan line (G1) from a gate driving unit (40), the source terminal (S) is connected to a data line (D1) from a data driving unit (50) and the drain terminal (D) is connected to the display electrode (33). With further reference to FIG. 1, the first liquid crystal capacitor ($C_{LCR}$) is consisted of the display electrode (33), the liquid crystal layer (20) and the first common electrode (11). The first liquid crystal capacitor ($C_{LCR}$) is connected to the drain terminal (D) of the transistor (Q11). The second liquid crystal capacitor ($C_{LCT}$) is consisted of the display electrode (33), the liquid crystal layer (20) and the second common electrode (13). The second liquid crystal capacitor ($C_{LCT}$) is coupled to the drain terminal (D).

When two different voltages are respectively provided to the first and second common electrodes (11, 13) and the transistor (Q1) is in a conductive condition, the first and second liquid crystal capacitors ($C_{LCR}$, $C_{LCT}$) have different voltages. The V-T curves of the reflective region and transmission region of the conventional transflective LCD may be very different from each other when a pixel is driven only by a single driving voltage. Unlike the conventional transflective LCD, the transflective LCD in accordance with the present invention supplies different voltages to the first and second common electrodes (11, 13) to produce V-T curves of the reflective region (R) and transmission region (T), wherein the V-T curves are adjustable to be close to each other by determining proper voltages supplied to the first and second common electrodes.

Based on the forgoing description, the transflective LCD in accordance with the present invention neither needs two gamma curves to adjust two V-T curves of the reflective and transmission regions nor uses two TFT driving circuits in the same pixel. Therefore, the fabricating cost of the present invention will be kept in a reasonable price and the effective area of each pixel will not be reduced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A transflective liquid crystal display device having a dual common-electrode structure, the transflective liquid crystal display device having a plurality of pixel unit, each pixel unit comprising:
    a front substrate having a first common electrode and a second common electrode separated from the first common electrode;
    a rear substrate having a thin film transistor, a storage capacitor, a display electrode, a reflective film covering the thin film transistor, the storage capacitor, and part of the display electrode, wherein the reflective film is corresponding to the first common electrode and the display electrode without the reflective film thereon is corresponding to the second common electrode; and
    a liquid crystal layer sealed between the front substrate and the rear substrate.

2. The transflective LCD as claimed in claim 1, wherein a first contact pad is connected to the first common electrode, and a second contact pad is connected to the second common electrode.

3. The transflective LCD as claimed in claim 1, wherein a ratio of area of the first common electrode to the second common electrode approximates to a ratio of area of the reflective region to the transmission region.

4. The transflective LCD as claimed in claim 2, wherein a ratio of area of the first common electrode to the second common electrode approximates to a ratio of area of the reflective region to the transmission region.

* * * * *